United States Patent
Elnashar et al.

[11] Patent Number: 5,903,601
[45] Date of Patent: May 11, 1999

[54] POWER REDUCTION FOR UART APPLICATIONS IN STANDBY MODE

[75] Inventors: Khodor S. Elnashar, Dallas; Mahmoud M. Yazdani, Allen; Clarence D. Lewis, Richardson, all of Tex.

[73] Assignee: Texas Instruments Incorporated, Dallas, Tex.

[21] Appl. No.: 08/768,249

[22] Filed: Dec. 17, 1996

[51] Int. Cl.$^6$ ....................................................... G06F 1/32
[52] U.S. Cl. .......................... 375/220; 375/377; 395/560; 395/750.04; 395/750.05; 395/750.06; 455/574; 331/187; 365/227; 327/143; 327/211; 327/544
[58] Field of Search ..................................... 375/219, 220, 375/354, 377; 395/750.04–750.08, 556, 560; 364/707, DIG. 1, 238.3, 239.2, 270, 273.1, 273.2, 273.5, DIG. 2, 948.8; 455/13.4, 343, 574; 331/74, 107 R, 108 R, 108 C, 158, 160, 172, 173, 175, 185, 187; 365/226, 227, 229; 327/149, 142, 143, 199, 210, 211, 291, 293, 530, 538, 542, 544

[56] References Cited

U.S. PATENT DOCUMENTS 5,150,081  9/1992  Goldberg ................................. 31/109
5,568,100  10/1996  Locanthi ................................. 331/74
5,628,020  5/1997  O'Brien ................................. 395/750
5,661,751  8/1997  Johnson ................................. 375/219

*Primary Examiner*—Amanda T. Le
*Attorney, Agent, or Firm*—Wade James Brady, III; Richard L. Donaldson

[57] ABSTRACT

A power reduction system for a UART system having a controllable oscillator for producing free-running clock signals. A controlled clock synchronizer having an output terminal is coupled to the oscillator and responsive to both a first control signal thereto and application of the free-running clock signals thereto to provide synchronized pulses and is responsive to both a second control signal different from the first control signal thereto and application of the free-running clock signals thereto to cease production of the synchronized pulses at the output terminal. A UART core controls the oscillator and the clock synchronizer and is operated under control of clock signals from the clock synchronizer. The controllable oscillator includes an inverter having a feedback circuit thereacross including a switch responsive to the third control signal to cause the oscillator to cease oscillation. The synchronizer includes a bistable circuit responsive to the first and second control signals and a gate responsive to the bistable circuit and the clock signals for controlling the status of the synchronized pulses at the output terminal.

15 Claims, 1 Drawing Sheet

POWER REDUCTION FOR UART APPLICATIONS IN STANDBY MODE

BACKGROUND OF THE INVENTION

1. Field of the Invention

This invention relates to a system for reduction in power dissipation for universal, asynchronous transmitter/receivers (UART) applications when in the standby mode.

2. Brief Description of the Prior Art

UARTs are interface circuits, generally in the form of integrated circuit chips, which are disposed between a data providing circuit, such as, for example, a personal computer (PC) and a modem to provide parallel to serial and serial to parallel data conversion. UARTs generally include an oscillator and a crystal to synchronize data conversion and therefore consume power when idle as well as when providing their data conversion function. It is desired to minimize the power dissipation of such UARTs when there is no data transfer at both serial and parallel ports, this feature being particularly useful in battery operated systems wherein power conservation is of great significance.

The prior art has attempted to minimize power consumption in UARTs by providing a UART having a sleep power mode wherein the power is turned off when in the standby mode (no data transfer). While this type of operation conserves power, it presents the problem that the system requires wake up time (time for transition out of this sleep mode and into an operational mode) to be fully operational and to operate at full speed. Accordingly, either a delay in operation is required or, if there is no delay, there is the possibility that data will be lost and/or mutilated during the wake up period (especially when the transfer rate is at high speed, such as, for example, in the megabaud range). Neither possibility is desirable and, often, neither possibility is acceptable.

SUMMARY OF THE INVENTION

In accordance with the present invention, the above noted problem of prior art UARTs is resolved and there is provided a UART which prevents the data mutilation and/or loss problem that occurs in prior art UARTs along with a power conservation scheme.

Briefly, this is accomplished by providing a UART capable of operating in two different power reduction modes, these modes being a low power mode wherein most but not all of the circuitry is shut off and operated at lower than normal power and a sleep power mode wherein the power utilized is substantially zero and most of the circuitry is turned off.

The transition from either low power or sleep mode to fully operational status is called "wake up". The UART enters the wake up mode as soon as data is sensed at either the parallel or serial input ports. The wake up time is equal to the maximum of one and one-half UART clock periods in the low power mode. Since the wake up time is fast in the low power mode, all megabaud transfers will be converted correctly without any data loss. Also, the UART will enter the low power mode quickly when no data transfer is occurring between parallel and serial ports.

DESCRIPTION OF THE PREFERRED EMBODIMENT

Figure 1:
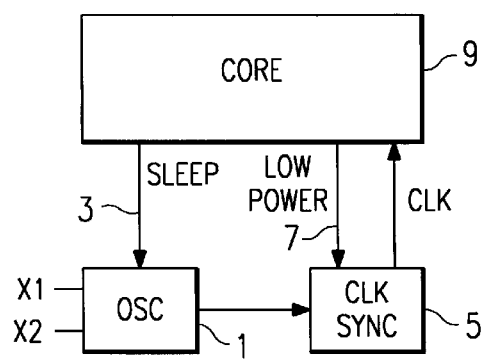
FIG. 1 is a block diagram of a UART with a core, oscillator and clock synchronizing circuit in accordance with the present invention.

Referring first to FIG. 1, there is shown a block diagram of a UART circuit in accordance with the present invention. The UART circuit includes an oscillator 1 (shown in greater detail in FIG. 2), which is a free-running clock having a power down terminal 3 which, when actuated, turns off the oscillator. Terminals X1 and X2 to oscillator 1 are the terminals of the external crystal required and are also the input and output of the inverter 31 respectively, shown in FIG. 2. Terminal X1 is the input of a buffer whose output provides the clock to the clock synchronizer. When the oscillator is turned off, it provides no clock signals at its output and the UART uses essentially no power under this operating condition. When the power down terminal 3 is not actuated, the oscillator 1 provides clock pulses at its output to a clock synchronizer circuit 5 (shown in greater detail in FIG. 3). The clock synchronizer circuit 5 has an enabling terminal 7 coupled to the core 9. The clock synchronizer circuit 5 supplies the clock signals to the logic core UART circuit 9 when neither the power down terminal 3 nor the low power enabling terminal 7 are enabled. The clock synchronizer circuit 5 provides no clock pulses to the UART's core output as explained hereinbelow with reference to FIG. 3 when the low power enabling terminal 7 is actuated. The clock synchronizer circuit 5 supplies the clock signals to the logic core UART circuit 9 when neither the power down terminal 3 nor the low power enabling terminal 7 are enabled.

The core 9 provides the logic levels at terminals 3 and 7 based upon the status of signal levels received at the communication ports. Terminal 3 is active high, which means, for example, 5 volts, the oscillator 1 is turned off. Terminal 7 is active low which means, for example, zero volts at this terminal disables the output of the clock synchronizer 5.

In operation, the user programs the UART's internal register in the core (not shown) to conserve power in the sleep mode via terminal 3 or low power mode via terminal 7 based on the desired application. The UART enters either the sleep mode or the low power mode by activating either terminal 3 or terminal 7 if there are no characters transferred at either the serial or parallel ports of the system (not shown). The core deactivates either terminal 3 or terminal 7 if there is data transfer activity at the system input ports and the UART enters the wake up mode and starts converting the data. The wake up time differs significantly for each mode. This wake up time has direct impact on the transfer rate of the UART.

The UART consumes power when the internal clock, i.e. oscillator 1 and clock synchronizer 5, continues to run. Most of the power is consumed by the core 9 and the rest of the power is consumed by the oscillator 1 and clock synchronizer 5.

When the user programs the UART in the sleep mode, the core 9 toggles terminal 3 based on the character transfer activity. The core 9 generates low level logic (for example, 0 volts) at terminal 3 if the UART is active in data transfer. A low logic level at terminal 3 enables the oscillator 1. When the oscillator 1 is enabled, the oscillator generates a free running clock to the clock synchronizer 5 and consequently to the core 9. When the core 9 detects no character transfers at its ports, the core outputs a high logic level on terminal 3. A high level on terminal 3 disables the oscillator 1 and no output clock is sourced to circuit 5 and therefore to circuit 9. In this case, the UART has a dc level clock from the clock synchronizer 5, which reduces the power of the UART to almost zero. The core 9 deactivates terminal 3 (logic low) as soon as data transfer starts at the input ports.

Figure 2:
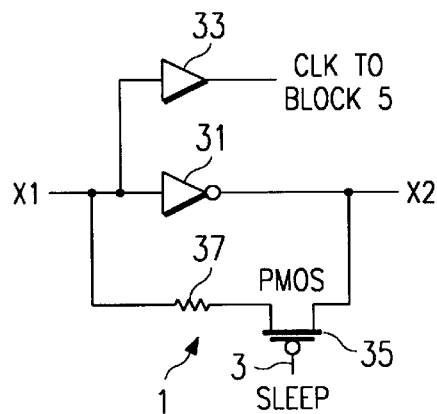
FIG. 2 is a circuit diagram of the oscillator circuit of FIG. 1.

Referring to FIG. 2, there is shown the oscillator circuit 1 of FIG. 1. The oscillator circuit 3 includes an inverter 31 having the input X1 from an external crystal and an output X2 back to the external crystal. This input is also passed via an amplifier 33 to the clock synchronizer 5. A feedback path is provided across the inverter 31 which includes a switch 35 in the form of a PMOS transistor having a gate electrode coupled to terminal 3 from the core 9 in series with a resistor 37.

In the sleep mode, as stated above, the oscillator 1 is turned off. This is accomplished, for example, by providing an oscillator composed of an inverter 31 with resistive feedback 37 from output to input. To turn off the oscillator, the feedback path is opened via switch 35, thereby terminating oscillation and shutting down the oscillator. The power down terminal 3 is the gate of a semiconductor PMOS switch 35 in the feedback circuit. A logic high at terminal 3 opens the switch 35 and the oscillator will then operate as an inverter and provide a static high or static low signal and the output of the buffer 33 will be a static high or low and no clock pulses are generated for synchronizing circuit 5.

A problem with conversion from the sleep mode to the wake up mode is that the oscillator 1 requires a significant time in terms of a millisecond to wake up and to output a clock to synchronizing circuit 5 and 9. This slow wake up time is not fast enough to capture and convert the data at a fast megabaud rate. To conserve power and convert data correctly at the megabaud rate, operation in a low power mode as opposed to the shut down mode discussed above is required.

In the low power mode, the core 9 toggles terminal 7 based upon the character transfer activity. The oscillator 1 is always on and generating a free running clock to the clock synchronizer 5. The core 9 generates a high logic level at terminal 7 if the UART is active in data transfer. A high logic level at terminal 7 enables the clock synchronizer circuit 5 and the clock synchronizer passes the clock from circuit 1 to the core 9. When the core 9 detects no character transfers at its ports, the core outputs a low logic level on terminal 7. A low logic level on terminal 7 disables the clock synchronizer 5 and a dc low level output is sourced to circuit 9. In this case, the power in the core 9 is reduced to zero and only circuits 1 and 5 are consuming power. The total power is significantly reduced compared to the power during a standard mode. The core 9 deactivates terminal 7 as soon as data transfer starts between the input ports. However, with reference to FIGS. 3 and 4, the wake up time for the clock synchronizer 5 is extremely fast since it requires as a maximum 1.5 clock periods to start passing the clock from the oscillator 1 to the core 9. This fast wake up time allows the core 9 to capture and convert high speed data successfully without any data loss.

Figure 3:
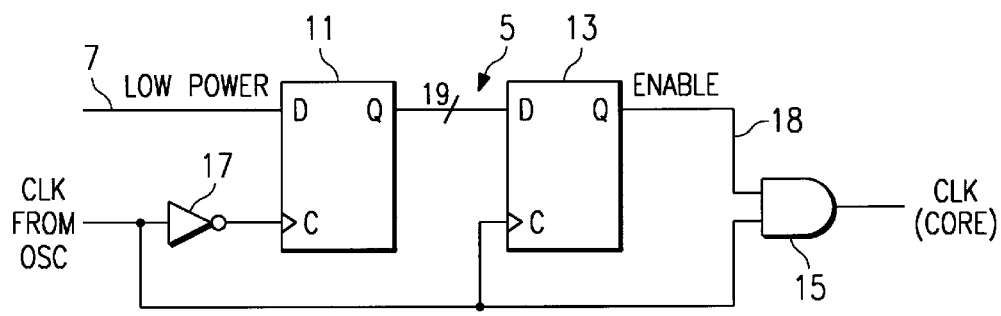
FIG. 3 is a circuit diagram of the clock synchronizing circuit of FIG. 1.
Figure 4:
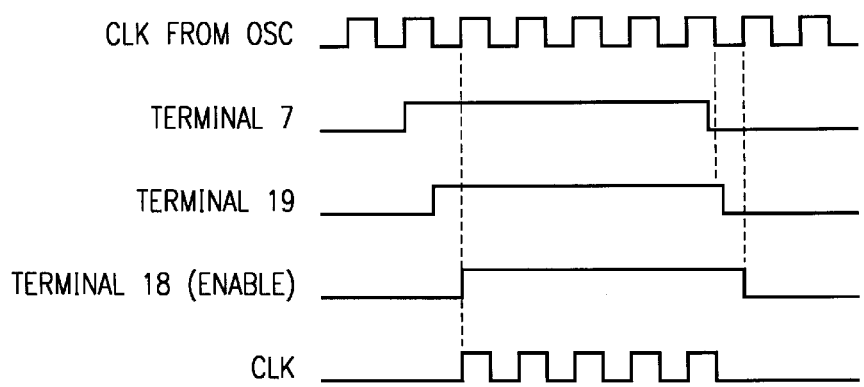
FIG. 4 is a timing diagram for the circuit of FIG. 3 showing the relationship of the signals on terminals 7, 18, 19 with respect to the clock signals from the oscillator 1.

Referring to FIGS. 3 and 4, the clock synchronizer 5 in accordance with the present invention provides operation as discussed above with reference to FIG. 1. More specifically, the synchronizer includes a positive edge triggered flip flop 11 having a clock input C, an input D coupled to the low power input 7 from the core 9 and an output terminal Q, a flip flop 13 having a clock input C, an input D coupled to the output Q of flip flop 11 and an output terminal Q coupled to an input of an AND gate 15 having a pair of input terminals and an output terminal to the core UART 9. The output of oscillator 3 is coupled, via an inverter 17 to the clock input C of flip flop 11, to the clock input C of flip flop 13 and to the other of the inputs of AND gate 15.

The purpose of the clock synchronizer 5 is to produce a glitch-free output to the core 9 when terminal 7 toggles. To guarantee full and reliable functionality of the core 9, a glitch-free clock is required when the core wakes up and goes to sleep or is under low power. The synchronizing circuit 5 operates in the following manner with reference to FIGS. 3 and 4. Flip flop 11, which receives and inverted clock signal at its C input via inverter 17, captures the logic level of terminal 7 at the falling edge of the free-running clock. Since terminal 7 is an asynchronous signal and has no time reference to the clock from the oscillator 1, a metastability problem might occur due to a violation problem of the setup and hold time. If a metastability problem occurred, the output of the flip flop 11 will not be stable immediately after the clock edge but it will settle to a known state after less than half a clock period. Another flip flop 13, which has an uninverted clock input at its C input, is required to capture the stable output 19 of flip flop 11 at the next rising edge of the clock. Therefore, the output 18 of flip flop 13, which is the "enable" output, is stable and synchronized to the rising edge of the clock from the oscillator 1. Since the inputs of AND gate 15 are synchronized, the output from AND gate 15 will be a glitch-free output. For terminal 7=logic low, enable (18)=logic low after maximum 1.5 clock period, clock=logic low (turns off the core 9). During wake up, terminal 7=logic high, enable (18)=logic high after maximum 1.5 clock period, clock=clock from the oscillator (core resumes activity).

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A power reduction system for a UART system, which comprises:

(a) a controlled oscillator for producing free-running clock signals;

(b) a controlled clock synchronizer having an output terminal, said clock synchronizer coupled to said oscillator and responsive to both a first control signal thereto and application of said free-running clock signals thereto to provide synchronized pulses and responsive to both a second control signal thereto different from said first control signal thereto and application of said free-running clock signals thereto to cease production of said synchronized pulses at said output terminal; and (c) a UART core controlling said oscillator and said clock synchronizer and operational under control of clock signals from said clock synchronizer.

2. The system of claim 1 wherein said controllable oscillator includes circuitry responsive to a third control signal from said UART core to cause said oscillator to cease oscillation.

3. The system of claim 2 wherein said oscillator includes an inverter having a feedback circuit thereacross and said circuitry responsive to a third control signal is a switch in said feedback circuit.

4. The system of claim 3 wherein said synchronizer includes a bistable circuit responsive to said first and second control signals and a gate responsive to said bistable circuit and said clock signals for controlling the status of said synchronized pulses at said output terminal.

5. The system of claim 4 wherein said gate is an AND gate.

6. The system of claim 9 wherein said bistable circuit is a first flip flop having an output and a second flip flop responsive to said output of said first flip flop to provide an input to said gate.

7. The system of claim 4 wherein said bistable circuit is a first flip flop having an output and a second flip flop responsive to said output of said first flip flop to provide an input to said gate.

8. The system of claim 2 wherein said synchronizer includes a bistable circuit responsive to said first and second control signals and a gate responsive to said bistable circuit and said clock signals for controlling the status of said synchronized pulses at said output terminal.

9. The system of claim 8 wherein said gate is an AND gate.

10. The system of claim 9 wherein said bistable circuit is a first flip flop having an output and a second flip flop responsive to said output of said first flip flop to provide an input to said gate.

11. The system of claim 8 wherein said bistable circuit is a first flip flop having an output and a second flip flop responsive to said output of said first flip flop to provide an input to said gate.

12. The system of claim 1 wherein said synchronizer includes a bistable circuit responsive to said first and second control signals and a gate responsive to said bistable circuit and said clock signals for controlling the status of said synchronized pulses at said output terminal.

13. The system of claim 12 wherein said gate is an AND gate.

14. The system of claim 13 wherein said bistable circuit is a first flip flop having an output and a second flip flop responsive to said output of said first flip flop to provide an input to said gate.

15. The system of claim 12 wherein said bistable circuit is a first flip flop having an output and a second flip flop responsive to said output of said first flip flop to provide an input to said gate.

* * * * *

UNITED STATES PATENT AND TRADEMARK OFFICE
CERTIFICATE OF CORRECTION

PATENT NO. : 5,903,601
DATED : May 11, 1999
INVENTOR(S) : Khodor S. Elnashar, et. al.

It is certified that error appears in the above-identified patent and that said Letters Patent is hereby corrected as shown below:

Title page, insert the following:

[60] Provisional application No. 60/009,157, filed Dec. 22, 1995--.

Column 1, line 2, insert the following:

--CROSS REFERENCE TO RELATED APPLICATION
Reference is made to and priority claimed from U.S. Provisional application Ser. No. 60/009,157 filed Dec. 22, 1995, entitled POWER REDUCTION FOR UART APPLICATIONS IN STANDBY MODE Signed and Sealed this Sixteenth Day of November, 1999

*Attest:*

*Attesting Officer*

Q. TODD DICKINSON

*Acting Commissioner of Patents and Trademarks*